(12) United States Patent
Orlowski et al.

(10) Patent No.: US 12,410,884 B2
(45) Date of Patent: Sep. 9, 2025

(54) COMPACT SWING ARM ASSEMBLIES

(71) Applicant: Hubbell Incorporated, Shelton, CT (US)

(72) Inventors: Paul Anthony Orlowski, Winsted, CT (US); John K Carrozzo, Torrington, CT (US)

(73) Assignee: Hubbell Incorporated

( * ) Notice: Subject to any disclaimer, the term of this patent is extended or adjusted under 35 U.S.C. 154(b) by 17 days.

(21) Appl. No.: 18/505,352

(22) Filed: Nov. 9, 2023

(65) Prior Publication Data
US 2024/0077172 A1 Mar. 7, 2024

Related U.S. Application Data

(63) Continuation of application No. PCT/US2022/028183, filed on May 6, 2022.

(60) Provisional application No. 63/186,138, filed on May 9, 2021.

(51) Int. Cl.
F16M 13/02 (2006.01)
(52) U.S. Cl.
CPC ................. F16M 13/022 (2013.01)
(58) Field of Classification Search
CPC ................................................. F16M 13/022
See application file for complete search history.

(56) References Cited

U.S. PATENT DOCUMENTS

| | | | | |
|---|---|---|---|---|
| 5,189,723 | A * | 2/1993 | Johnson | G02B 6/4454 385/134 |
| 7,330,625 | B2 * | 2/2008 | Barth | G02B 6/501 385/134 |
| 7,333,320 | B2 * | 2/2008 | Standish | H02G 9/10 361/636 |
| 8,249,411 | B2 * | 8/2012 | Burke | G02B 6/4442 385/135 |
| 8,847,070 | B2 * | 9/2014 | Burke | H02G 9/10 174/37 |
| 9,612,415 | B2 * | 4/2017 | Adams | G02B 6/4442 |
| 10,230,223 | B2 * | 3/2019 | Kemp | H02G 3/10 |
| 2009/0175588 | A1 | 7/2009 | Brandt | |
| 2014/0196380 | A1 * | 7/2014 | Burke | H02B 1/50 52/20 |
| 2015/0104142 | A1 | 4/2015 | Adams | |
| 2017/0176702 | A1 | 6/2017 | Adams | |
| 2017/0353019 | A1 | 12/2017 | Kemp | |

* cited by examiner

*Primary Examiner* — Monica E Millner
(74) *Attorney, Agent, or Firm* — Ruggiero McAllister & McMahon LLC; Edward L McMahon

(57) ABSTRACT

A compact swing arm assembly is provided that has a mounting pad, a base, and an extension. The extension is secured to the base at a slot so that the extension pivots with respect to the base about a pin through the slot and translates along the slot between a stowed position and a deployed position. The slot has a first end proximate the mounting pad and a second end remote from the mounting pad. The base has a first tab and a second tab. The extension, when stowed, is positioned with the pin in the slot proximate the second end and a first side of the extension is against the first tab at a stowed point of contact. The extension, when deployed, is positioned with the pin proximate the first end and the first side abutting the first and second tabs at two deployed points of contact.

14 Claims, 6 Drawing Sheets

COMPACT SWING ARM ASSEMBLIES

CROSS REFERENCE TO RELATED APPLICATIONS

This application is a continuation of International Application PCT/US22/28183 filed, May 6, 2022, which claims the benefit of Provisional Application 63/186,138 filed May 9, 2021, the entire contents of all of which are incorporated herein by reference.

BACKGROUND

1. Field of the Invention

The present disclosure is related to swing arm assemblies that move between a stowed position and a deployed position. More particularly, the present disclosure is related to compact swing arm assemblies for use in vaults having high cable densities.

2. Description of Related Art

Utility equipment such as, but not limited to telecommunications cables, are typically passed from a utility station to a neighborhood and then on to individual homes. For example, telecommunications cables may include fiber or copper cables that are run in a neighborhood. Many communication cables are known to have minimum bending radius limitations, where violations of such minimum bending radius limitations can damage the cables.

At certain locations, such as a junction leading to the neighborhood and/or the individual homes, a plurality of the cables may enter a protective enclosure or vault where those cables are connected to a common connection device such as, but not limited to a junction box, wiring enclosure, a multiport service terminal, and others. The vault and/or cables may be fully buried, partially buried, or fully exposed above the ground.

The density of cables/equipment inside the vault and/or the position of the vault can make servicing difficult. Thus, it is known to mount the common device to the vault by a swing arm assembly. The swing arm assembly allows for movement of the common device between a stowed position, where the device is protected inside the vault, and a deployed position where the device is at least partially exterior to the vault.

Further, there is often a desire to minimize the number of vaults in a service area for both aesthetics and cost reasons, which can further increase the density of cables/equipment inside of the vault.

It has been determined by the present disclosure that the prior art swing arm assemblies have proven less than optimal when attempting to balance the minimum bending radius limitations, the cable density in the vault, and the movement between the stowed and deployed positions without binding or pinching the cables.

Accordingly, it has been determined by the present disclosure that there is a continuing need for swing arm assemblies that overcome, alleviate, and/or mitigate one or more of the aforementioned and other deleterious effects of prior art assemblies.

SUMMARY

A compact swing arm assembly having a mounting pad, a base, and an extension. The extension is secured to the base at a slot so that the extension is pivotally movable with respect to the base about a pin through the slot and is translationally moveable along the slot between a stowed position and a deployed position. The slot has a first end proximate the mounting pad and a second end remote from the mounting pad. The base has a first tab and a second tab that. The extension, in the stowed position, is positioned with the pin in the slot proximate the second end and a first side of the extension is against the first tab at a stowed point of contact. The extension, in the deployed position, is positioned with the pin proximate the first end and the first side abutting the first and second tabs at two deployed points of contact.

In some embodiments either alone or together with any one or more of the aforementioned and/or after-mentioned embodiments, the mounting pad depends from the extension at an angle between 0 and 90 degrees.

In some embodiments either alone or together with any one or more of the aforementioned and/or after-mentioned embodiments, the assembly has an angle adjuster connecting the mounting pad and the extension so that the angle is adjustable.

In some embodiments either alone or together with any one or more of the aforementioned and/or after-mentioned embodiments, the extension has a set length.

In some embodiments either alone or together with any one or more of the aforementioned and/or after-mentioned embodiments, the assembly has a length adjuster configured so that the extension has an adjustable length.

In some embodiments either alone or together with any one or more of the aforementioned and/or after-mentioned embodiments, the slot is linear between the first and second ends.

In some embodiments either alone or together with any one or more of the aforementioned and/or after-mentioned embodiments, the slot has a major axis in a direction between the mounting pad and the base and a minor axis perpendicular to the major axis, where the major axis is longer than the minor axis.

In some embodiments either alone or together with any one or more of the aforementioned and/or after-mentioned embodiments, the pin is bolt and nut.

In some embodiments either alone or together with any one or more of the aforementioned and/or after-mentioned embodiments, the stowed point of contact and the two deployed points of contact are on perpendicular planes from one another.

In some embodiments either alone or together with any one or more of the aforementioned and/or after-mentioned embodiments, the base has a third tab spaced from the first tab remote from the pin, the third tab distributing forces and bending moments from the extension on a third deployed point of contact.

A communication hub is provided that includes a vault, a common connection device, and a swing arm assembly. The swing arm assembly connects the common communication device to the vault so that the common connection device is movable between a stowed position and a deployed position. The swing arm assembly has a mounting pad secured to the coming connection device, a base secured to a vault, and an extension depending from the mounting pad and secured to the base at a slot so that the extension is pivotally movable with respect to the base about a pin through the slot and is translationally moveable along the slot between the stowed position and the deployed position. The slot has a first end proximate the mounting pad and a second end remote from the mounting pad. The base includes a first tab and a second tab that are spaced from one another and are positioned on opposing sides of the slot. The common connection device, when in the stowed position, is interior to the vault with the extension positioned with the pin in the slot proximate the second end and a first side of the extension against the first tab at a stowed point of contact. The common connection device, when in the deployed position, is at least partially exterior to the vault with the extension positioned so that the pin is proximate the first end and so that the first side of the extension abuts the first and second tabs at two deployed points of contact.

In some embodiments either alone or together with any one or more of the aforementioned and/or after-mentioned embodiments, the hub further includes a plurality of communication cables operatively coupled to the common connection device at an interface of the mounting pad and the common connection device.

In some embodiments either alone or together with any one or more of the aforementioned and/or after-mentioned embodiments, the swing arm assembly is configured to provide sufficient clearance at an interface region of the mounting pad and the common connection device such that the plurality of cables pass through the interface without pinching or binding during movement between the stowed and deployed positions.

In some embodiments either alone or together with any one or more of the aforementioned and/or after-mentioned embodiments, the base is secured to the vault by a fastener including one or more of a mechanical connector, an adhesive, a solder, a braze, a weld, an integral formation of the base and the vault as a unitary component, and any combinations thereof.

In some embodiments either alone or together with any one or more of the aforementioned and/or after-mentioned embodiments, the extension has a set length.

In some embodiments either alone or together with any one or more of the aforementioned and/or after-mentioned embodiments, the slot is linear between the first and second ends.

In some embodiments either alone or together with any one or more of the aforementioned and/or after-mentioned embodiments, the slot has a major axis in a direction between the mounting pad and the base and a minor axis perpendicular to the major axis, where the major axis is longer than the minor axis.

In some embodiments either alone or together with any one or more of the aforementioned and/or after-mentioned embodiments, the stowed point of contact and the two deployed points of contact are on perpendicular planes from one another.

In some embodiments either alone or together with any one or more of the aforementioned and/or after-mentioned embodiments, the base includes a third tab spaced from the first tab remote from the pin, the third tab distributing forces and bending moments from the extension on a third deployed point of contact.

The above-described and other features and advantages of the present disclosure will be appreciated and understood by those skilled in the art from the following detailed description, drawings, and appended claims.

DESCRIPTION OF THE DRAWINGS

FIG. 4b is an end view of the assembly of FIG. 4a; and

DETAILED DESCRIPTION

Figure 1:
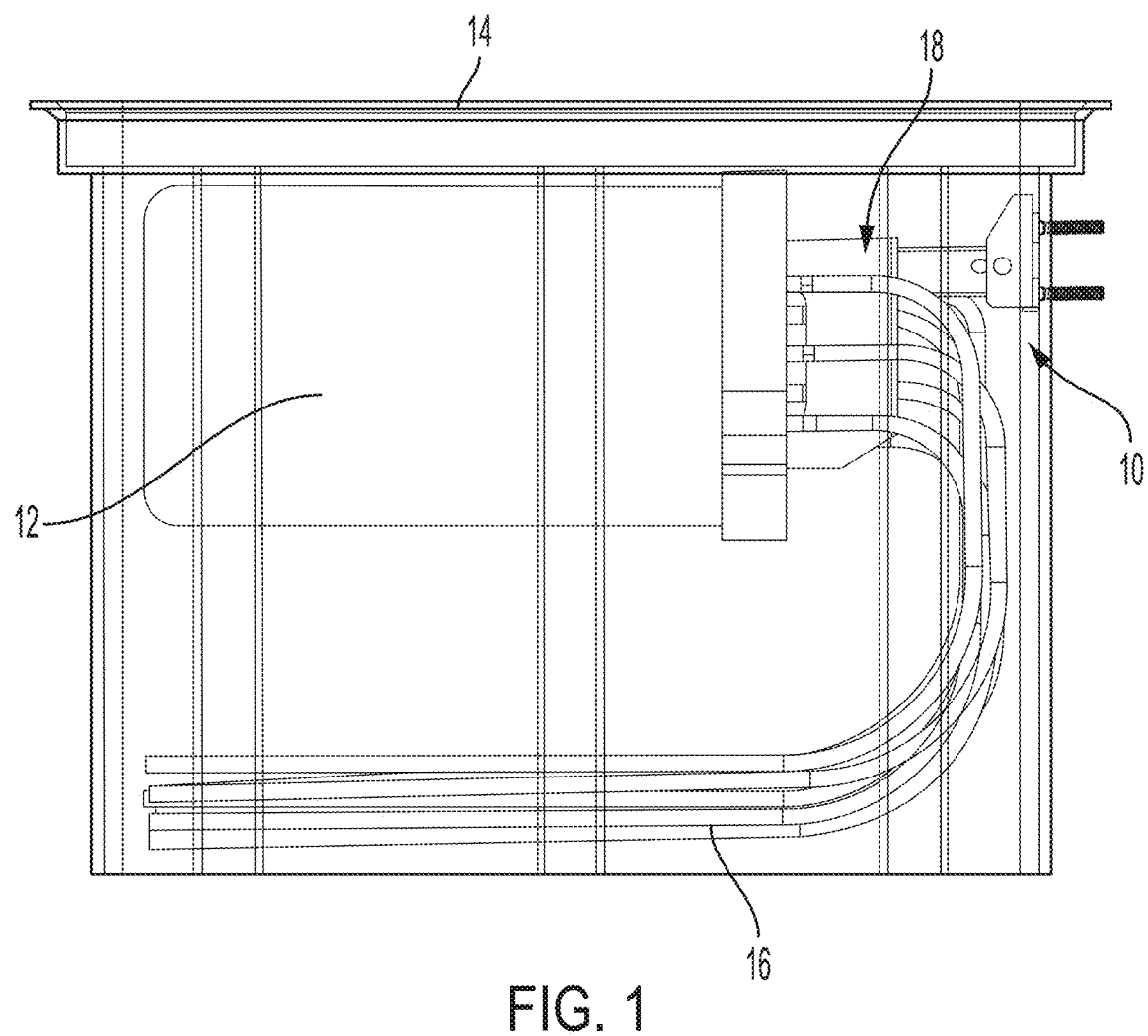
FIG. 1 is a side of an exemplary embodiment of a compact swing arm assembly according to the present disclosure shown positioning a common communication device and a plurality of cables in a stowed position with respect to a vault.
Figure 2:
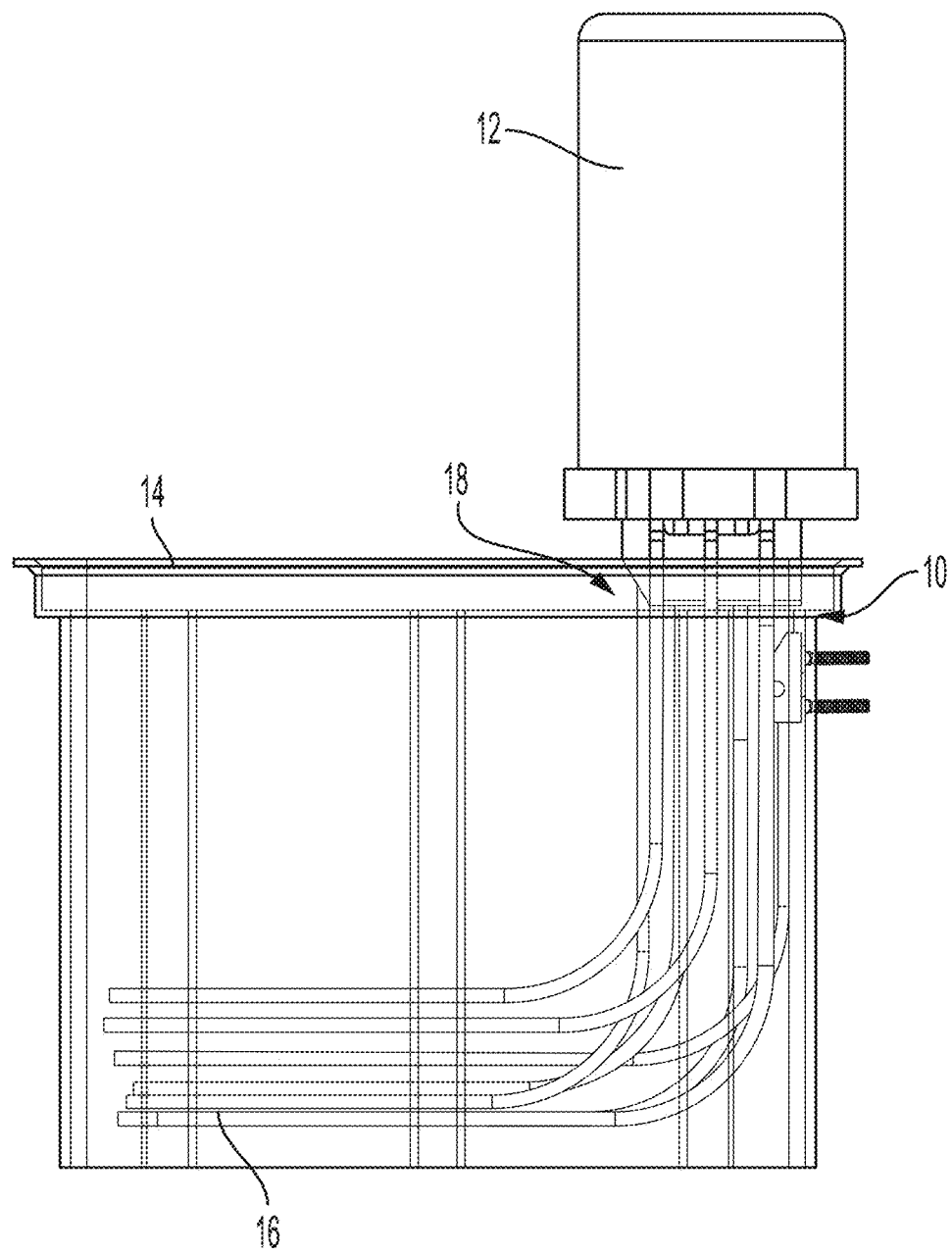
FIG. 2 is a side view of the assembly of FIG. 1 shown positioning the common communication device and cables in a deployed position with respect to the vault.

Referring to the drawings and in particular to FIGS. 1 and 2, an exemplary embodiment of a compact swing arm assembly according to the present disclosure is shown and is generally referred to by reference numeral 10. Assembly 10 is shown in use securing a common connection device 12 in a protective enclosure or a vault ("vault") 14, where device has one or more communication cables 16 operatively coupled thereto and passing to the exterior of the vault so as to define a communication hub.

Advantageously, assembly 10 is a compact design, with a minimal number of components, that provides the space necessary to balance the minimum bending radius limitations and/or the cable density limitations in the vault, while still allowing for movement of device 12 with respect to vault 14 between a stowed position (FIG. 1) and a deployed position (FIG. 2).

In the stowed position, device 12 is interior to vault 14, while in the deployed position the device is at least partially exterior to the vault.

Assembly 10 is configured to ensure cables 16 operatively coupled to device 12 do not violate minimum bending radius limitations in the stowed and/or deployed positions. For example, assembly 10 provides sufficient clearance at an interface region 18 of the assembly and device 12 such that cables 16 pass through the interface without pinching or binding during movement between the stowed and deployed positions—and while stored in those positions.

Assembly 10 is described in more detail with simultaneous reference to FIGS. 3, 4a-4b, and 5. Here, assembly 10 is shown including a mounting pad 20, an extension 22, and a base 24.

Mounting pad 20 can be configured with any desired shape necessary to secure the desired device 12 to assembly 10.

Figure 5:
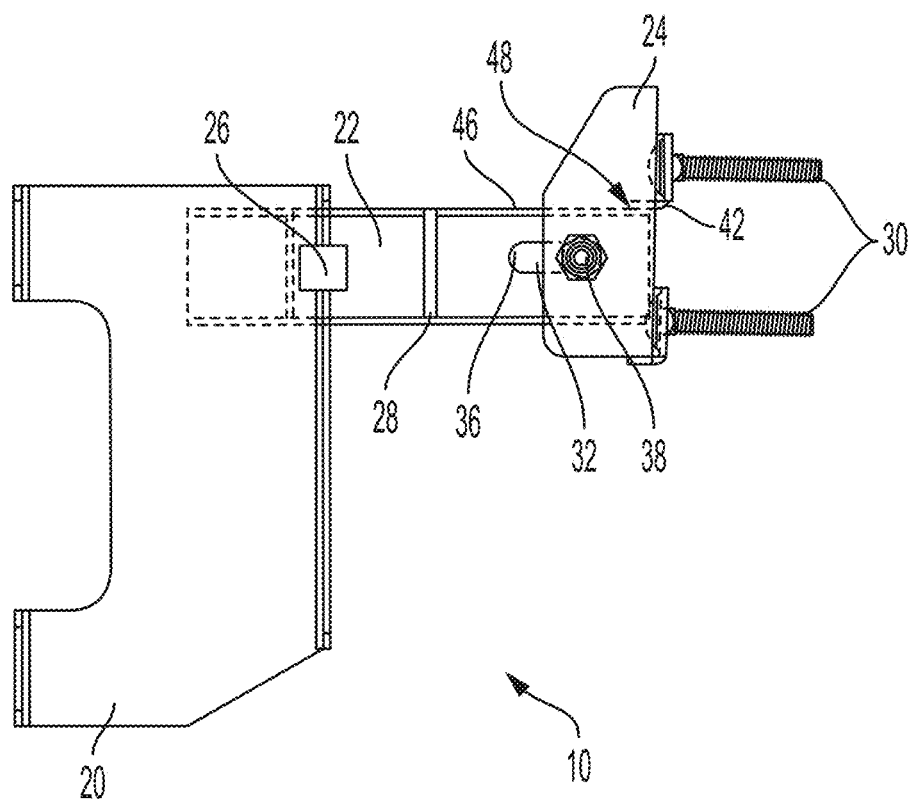
FIG. 5 is a side view of an alternate exemplary embodiment of the assembly of FIG. 3 in the stowed position.

Pad 20 depends from extension 22. In the illustrated embodiment, pad 20 depends from extension 22 so that the pad and extension are perpendicular to one another. Of course, it is contemplated by the present disclosure for pad 20 and extension 22 to define any desired angle therebetween. Moreover and as illustrated in FIG. 5, pad 20 can depend from extension 22 by way of an angle adjuster 26 that allows adjustment of the angle between the pad and extension between 0 and 90 degrees.

Extension 22 is shown in FIGS. 1 through 4b as a solid member having a set length. However and as illustrated in FIG. 5, it is contemplated by the present disclosure for extension 22 to include a length adjuster 28 that allows adjustment of the length between pad 20 and base 24.

Base 24 can be secured to vault 14 in any desired manner. In the illustrated embodiment, base 20 is shown secured to vault 14 by one or more fasteners 30 (two shown). It should be recognized that fasteners 30 are illustrated by way of example as mechanical fasteners. Of course, it is contemplated by the present disclosure for the one or more fasteners 30 to be any fastener capable of connecting base 24 and vault 14. In other embodiments, the securement of base 24 and vault 14 can be made by fasteners selected from a group consisting of adhesives, solders, brazes, welds, the base and vault being integrally formed as a unitary component, and any combinations thereof.

Figure 3:
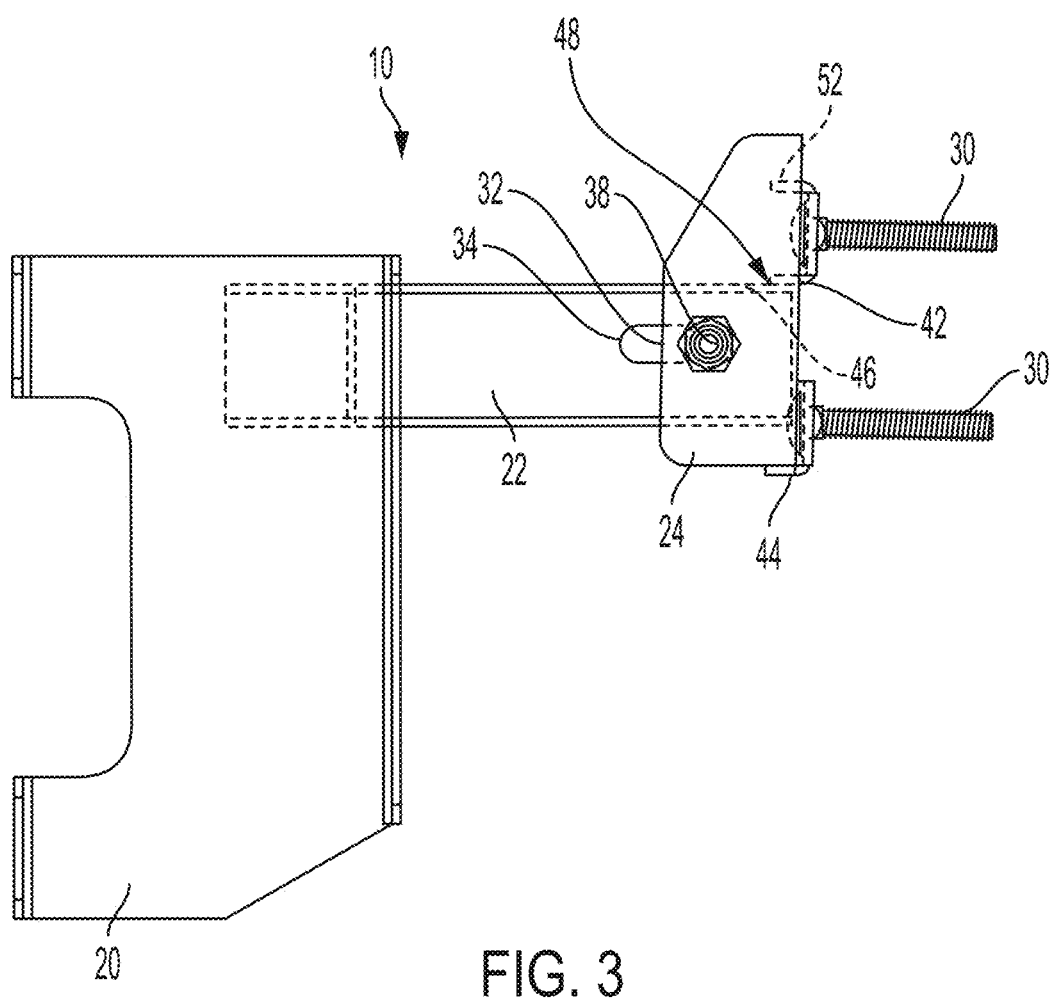
FIG. 3 is a side view of the assembly of FIG. 1 in the stowed position.
Figure 4A:
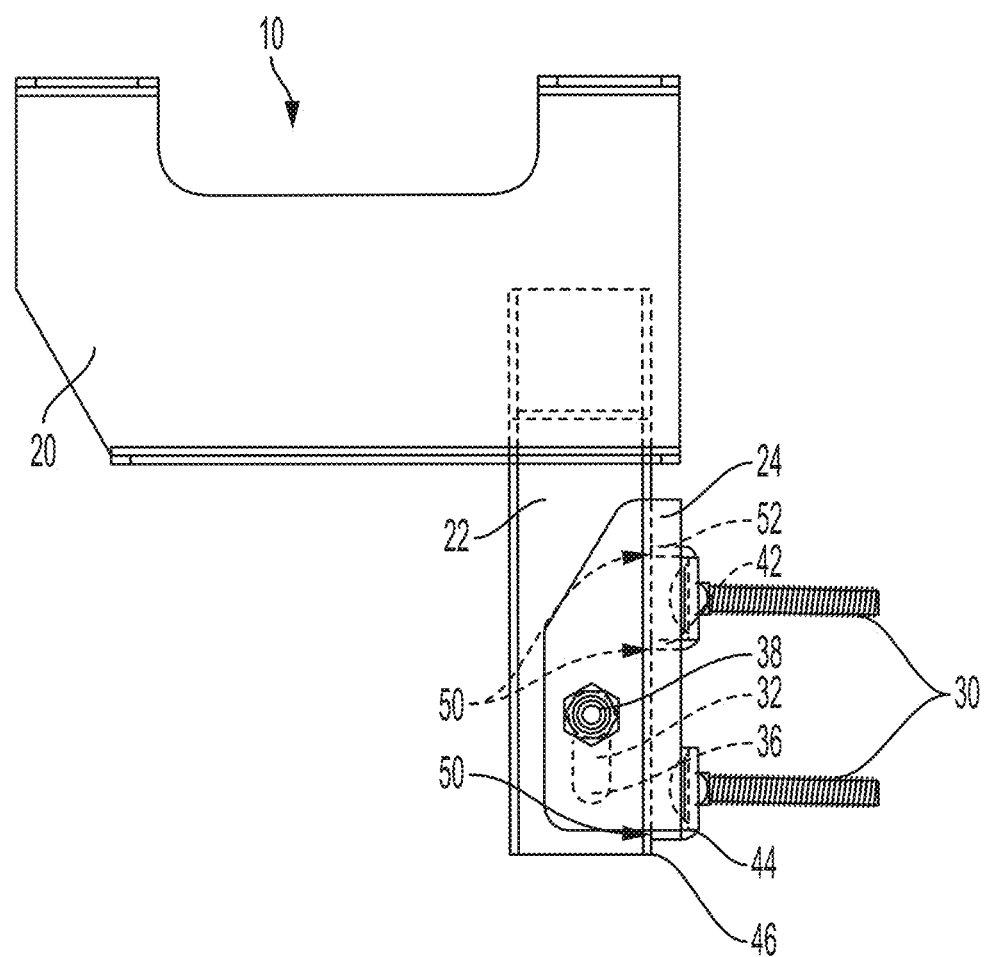
FIG. 4a is a side view of the assembly of FIG. 2 in the deployed position.

The movement of assembly 10 between the stowed position and the deployed position is described in more detail with simultaneous reference to FIGS. 3 and 4a.

Extension 22 includes a slot 32 having a major axis in the direction between pad 20 and base 24 and a minor axis perpendicular to the major axis, where the major axis is longer than the minor axis. In the illustrated embodiment, slot 32 is linear along the major axis. Of course, it is contemplated by the present disclosure for slot 32 to have any desired shape.

Slot 32 has a first end 34 proximate pad 20 and a second end 36 remote from the pad.

Extension 22 is secured to base 24 via a pin 38 through the base and slot 32 of the extension in a manner that allows for both pivotal movement of the extension and base with respect to one another about a pivot axis 40 (FIG. 4b) defined by the pin and translational movement along the slot along the major axis.

In the illustrated embodiment, pin 38 is shown as a bolt and nut. Of course, it is contemplated by the present disclosure for pin 38 to take any form sufficient to pivotally secure extension 22 and base 24.

Base 22 includes at least a first tab 42 and a second tab 44 spaced from one another and positioned on opposing sides of slot 32.

In the stowed position, extension 22 is moved so that pin 38 is positioned in slot 32 with the pin proximate second end 36 and so that gravity urges a first side 46 of the extension against first tab 42 at a stowed point of contact 48. Accordingly, the simple combination of slot 32, pin 38, and first tab 42 are sufficient to hold assembly 10 in the stowed position.

In the deployed position, extension 22 is moved so that pin 38 is positioned in slot 32 with the pin proximate first end 34 and so that first side 46 of the extension abuts first tab 42 and second tab 44 at two or more deployed points of contact 50. Again, the simple combination of slot 32, pin 38, and second tab 44 are sufficient to hold assembly 10 in the deployed position.

In some embodiments, stowed point of contact 48 and deployed points of contact 50 are on perpendicular planes from one another.

By eliminating the complex structures of the prior art, assembly 10 ensures sufficient clearance, when in the stowed and deployed positions, to ensure cables 16 operatively coupled to device 12 do not violate minimum bending radius limitations and provide sufficient clearance such that the cables are not pinched or bound during movement between the stowed and deployed positions.

Figure 4B:
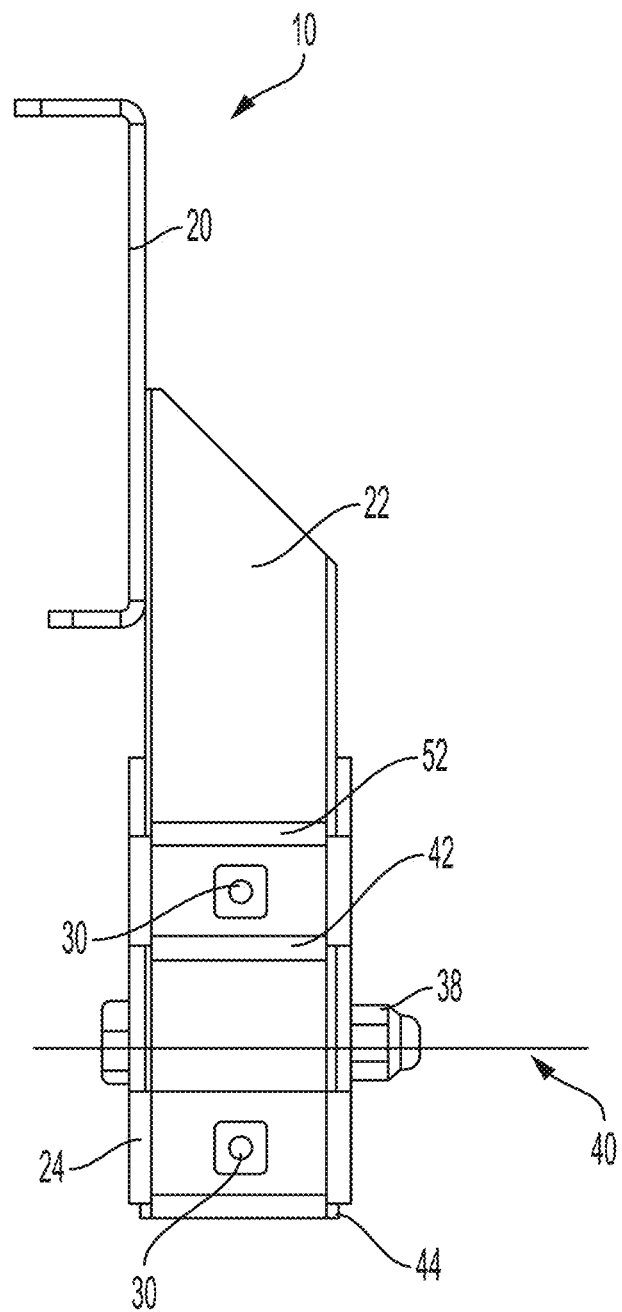

In the embodiment of FIGS. 3 and 4a-4b, base 24 further includes a third tab 52 spaced from first tab 42 to further distribute the forces and bending moments on extension 22 on a third deployed point of contact 50. Of course, it is contemplated by the present disclosure for base 24 to have at least two tabs 42, 44 as shown in FIG. 5 or more than three tabs, as necessary.

Assembly 10 can be made of any desired materials having sufficient strength to support device 12. For example, assembly 10 can be made of metals, polymers, or any combination thereof.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST compact swing arm 10
common connection device 12
protective enclosure or vault 14
communication cables 16
interface region 18
mounting pad 20
extension 22
base 24
angle adjuster 26
length adjuster 28
fasteners 30
slot 32
first slot end 34
second slot end 36
pin 38
pivot axis 40
first tab 42
second tab 44
first side 46 of extension
stowed point of contact 48
deployed points of contact 50
third tab 52

What is claimed is:

1. A compact swing arm assembly, comprising:
a mounting pad configured to secure a connection device thereto;
a base configured to be secured to a vault; and
an extension depending from the mounting pad and secured to the base at a slot so that the extension is pivotally movable with respect to the base about a pin through the slot and is translationally moveable along the slot between a stowed position and a deployed position, the slot has a first end proximate the mounting pad and a second end remote from the mounting pad, the base comprises a first tab and a second tab that are spaced from one another and are positioned on opposing sides of the slot,
wherein, when in the stowed position, the extension is positioned with the pin in the slot proximate the second end and a first side of the extension against the first tab at a stowed point of contact, and wherein, when in the deployed position, the extension is positioned with the pin proximate the first end and the first side abutting the first and second tabs at two deployed points of contact.

2. The assembly of claim 1, wherein the mounting pad depends from the extension at an angle between 0 and 90 degrees.

3. The assembly of claim 2, further comprising an angle adjuster connecting the mounting pad and the extension so that the angle is adjustable.

4. The assembly of claim 1, wherein the extension has a set length.

5. The assembly of claim 1, further comprising a length adjuster configured so that the extension has an adjustable length.

6. The assembly of claim 1, wherein the slot is linear between the first and second ends.

7. The assembly of claim 1, wherein the slot has a major axis in a direction between the mounting pad and the base and a minor axis perpendicular to the major axis, where the major axis is longer than the minor axis.

8. The assembly of claim 1, wherein the pin comprises bolt and nut.

9. The assembly of claim 1, wherein the stowed point of contact and the two deployed points of contact are on perpendicular planes from one another.

10. The assembly of claim 1, wherein the base further comprises a third tab spaced from the first tab remote from the pin, the third tab distributing forces and bending moments from the extension on a third deployed point of contact.

11. The assembly of claim 1, wherein the base is secured to the vault.

12. The assembly of claim 1, wherein the mounting pad is secure the connection device.

13. The assembly of claim 12, further comprising a plurality of communication cables operatively coupled to the connection device at an interface of the mounting pad and the connection device.

14. The assembly of claim 13, further comprising an interface region of the mounting pad and the connection device that has sufficient clearance such that the plurality of communications cables pass through the interface region without pinching or binding during movement between the stowed and deployed positions.

* * * * *